United States Patent Office 3,795,585
Patented Mar. 5, 1974

3,795,585
METHOD FOR MANUFACTURE OF
ALPHA-GALACTOSIDASE
Hideo Suzuki, Harumi Kobayashi, and Akira Kamibayashi, Chiba, Japan, assignors to Agency of Industrial Science & Technology, Tokyo, Japan
No Drawing. Filed Aug. 31, 1972, Ser. No. 285,510
Int. Cl. C12d 13/10
U.S. Cl. 195—65
1 Claim

ABSTRACT OF THE DISCLOSURE

A higher fatty acid, a higher alcohol, a higher aldehyde or a functional derivative thereof having 12 or more carbon atoms is incorporated as an agent for accelerating the formation of α-galactosidase into a basic culture medium containing carbon sources, nitrogen sources and inorganic salts. When an α-galactosidase producing mold is cultured in the culture medium thus prepared, α-galactosidase is produced in high yields in a short period of culturing time.

---

This invention relates to a method for producing α-galactosidase by culturing a mold. More particularly, this invention relates to an improvement in the production of α-galactosidase by the culture of a mold, which improvement resides in the fact that α-galactosidase of higher potency is produced in a shortened length of culturing time.

α-Galactosidase is known as an enzyme having an ability to hydrolyze raffinose into sucrose and galactose. It is used extensively in the beet industry. It is also utilized widely as a reagent for the quantitative assay of raffinose and for the determination of chemical structure of sugars moiety present in compounds. Application to pharmaceutical products such as, for example, digestive preparations is also contemplated.

The main object of this invention is to provide a method for producing α-galactosidase by use of a mold, which method permits the culturing time of the microorganism to be shortened markedly and enables the enzyme to be produced in higher yields.

The inventors carried out research to find a method which would enable efficient production of α-galactosidase. As a result, they have already proposed a method for hydrolyzing raffinose present in beet molasses or beet juice by using α-galactosidase which is produced by culturing a mold designated as *Mortierella vinacea* var. raffinose-utilizer (U.S. Pat. 3,647,625). After continuing further research, they have discovered that the length of culturing time is shortened markedly and α-galactosidase is formed in higher yields in the microorganic cells when a higher fatty acid, a higher alcohol, a higher aldehyde or a functional derivative thereof is incorporated into the culture medium at the time the culture medium is prepared. In the fermentative production of glutamic acid, biotin causes a decline of the formation of glutamic acid. To suppress such activity of biotin, an antibiotic substance or a surface active agent is added to the culture medium. This has come to constitute a popular practice in the art. The fact that the formation of a desired enzyme can be promoted by the incorporation of a higher fatty acid, etc. has never been known to the art at all. This knowledge has been brought to light for the first time by the inventors.

The aforementioned *Mortierella vinacea* var. raffinose-utilizer is not the only mold that can be used for the method of this invention. Many other molds of the kind which possess the ability to produce α-galactosidase can similarly be utilized in order for this enzyme to be produced advantageously by the method of this invention. Examples of such microorganisms include *Penicillium viridicalum* Westling, *Aspergillus inui*, *Aspergillus nidulans*, *Circinella chinensis* Naganishi et Kojiro, *Circinella sydowi* Lendner, *Circinella minor* Lendner, *Mucor pusillus* Lindt, and *Syncephalastrum racemosum* Shröter.

The basic culture medium to be used for the method of this invention is prepared by using carbon sources, nitrogen sources, inorganic salts and inducers such as lactose, galactose, raffinose and melibiose as are generally used in culturing mold. Starch, glucose, glycerin, maltose, dextrin, and sucrose may be cited as examples of carbon sources. Examples of nitrogen sources include soybean flour, peanut flour, cotton seed powder, corn steep liquor, meat extract, peptone, nitrates and ammonium salts. Sodium chloride, potassium phosphate, magnesium sulfate and the like may be used as inorganic salts.

According to the method of the present invention, an α-galactosidase producing mold is cultured in a basic culture medium having incorporated therein a higher fatty acid, a higher alcohol, a higher aldehyde or a functional derivative thereof having 12 or more carbon atoms at a proportion of between 0.025 and 0.1% by weight based on the medium. Consequently, α-galactosidase is formed in the microorganic cells in yields several times, or tens of times in case of certain species, as high as when the culture is carried out in a culture medium which does not include the said growth accelerator. Furthermore, the length of culturing time can be shortened markedly.

The higher fatty acid, higher alcohol, higher aldehyde or functional derivative thereof for use in this method may be in a saturated or unsaturated form.

Examples of such higher fatty acids are saturated fatty acid, lauric acid, tridecanoic acid, myristic acid, pentadecanoic acid, palmitic acid, heptadecanoic acid, stearic acid and nonadecanoic acid and unsaturated fatty acids such as oleic acid, elaidic acid, vaccenic acid, linoleic acid, linolenic acid, arachidonic acid, stearolic acid, cetoleic acid and erucic acid. These higher fatty acids are not always required to be in the free form. They may be in the form of such salts as sodium salts and potassium salts. The functional derivatives of these higher fatty acids include lower alkyl esters such as methyl esters, ethyl esters and propyl esters, acid halogenides such as acid chlorides, amides and glycerides, for example.

As higher alcohols for use in the present invention, there may be cited saturated alcohols such as lauryl alcohol, tridecyl alcohol, myristyl alcohol, pentadecyl alcohol, cetyl alcohol, heptadecyl alcohol, stearyl alcohol and nonadecyl alcohol and unsaturated alcohols such as oleyl alcohol, linoleyl alcohol and linolenyl alcohol. The functional derivatives of these higher alcohols suitable for this invention include esters with such lower fatty acids as acetic acid and propionic acid and ethers with such lower alcohols as methyl alcohol and ethyl alcohol.

Examples of higher aldehydes for use in the present invention include saturated aldehydes such as lauraldehyde, tridecanol, myristaldehyde, pentadecanal, palmitaldehyde, and stearaldehyde and unsaturated aldehydes such as oleylaldehyde and elaidylaldehyde. As the functional derivatives of these higher aldehydes, there may be used Schiff bases, acetals and the like.

These accelerating substances may be used either invidually or in the form of mutual mixtures or two or more members. The effective concentration at which they are used for the purpose of this invention is in the range of between 0.025% and 0.1% by weight based on the basic culture medium. They may be used without any inconvenience at concentrations exceeding the upper limit of the said range, though such excess concentration hardly makes any contribution to the accelerating effect.

The explanation of this remarkable improvement offered by this invention postulates that the presence in the culture medium of such higher fatty acid having 12 or more carbon atoms enhances the assimilation of sugars by the mold and expedites the growth of the microorganic cells, with the result that the ability of the microorganism to produce α-galactosidase is increased accordingly. Similarly, advantageous results obtained by the presence of a higher alcohol or higher aldehyde is explained by reasoning that the higher alcohol or higher aldehyde is converted into a corresponding higher fatty acid when it undergoes oxidation while the aerobic culture is in progress.

When a mold possessed of lipase activity is used, the purpose of the present invention can fully be accomplished by incorporating into the culture medium a glyceride or fat, which is one form of higher fatty acid, in its unmodified state. This is reasonably explained by postulating that the fat is hydrolyzed by the mold and the higher fatty acid formed consequently contributes to the acceleration of α-galactosidase formation.

The culture of the mold is carried out by an ordinary aerobic culturing process. A basic culture medium is prepared with suitable carbon sources, nitrogen sources, inorganic salts and the like. A substance for accelerating the formation of α-galactosidase is added in a prescribed amount to the basic culture medium. A mold of the specified kind is inoculated to the culture medium and then subjected to either shaken culture or aerated culture at temperatures of about 30° C. for about 48–72 hours. The culture solution consequently obtained is divided by filtration into a liquid portion and a mass of cells. The separated mass of cells, after thorough washing with water, may be used in its unmodified state as an enzyme preparation. Otherwise, it may be subjected to crushing, then to extraction with a suitable solvent such as, for example, distilled water and put to use as an enzyme preparation, if so desired.

A culturing time of less than 72 hours suffices for the method of this invention, whereas more than at least 72 hours' culturing time is required for any of the conventional methods. Moreover, the enzyme which is obtained by this invention has a higher degree of activity per unit weight of microorganic cells. For the purpose of commercial operation, therefore, the method of this invention proves the be highly advantageous.

Preferred embodiments of this invention are described hereinafter. They should not be construed as limiting the present invention in any way.

EXAMPLE 1

An aqueous solution containing 1% of lactose, 1% of glucose, 1% of corn steep liquor, 0.6% of ammonium sulfate, 0.3% of calcium carbonate, 0.2% of sodium chloride, 0.2% of magnesium sulfate and 0.3% of potassium phosphate was adjusted to pH 5.0 with sodium hydroxide and sterilized to be used as the basic culture medium. *Mortierella vinacea* var. raffinose-utilizer, a mold was inoculated to 100 ml. of this basic culture medium and to 100 ml. of a culture medium prepared by having oleic acid incorporated as a substance for accelerating the formation of α-galactosidase into the basic culture medium, and subjected to shaken culture at 30° C. for 72 hours, with the shaking performed at the rate of 130 r.p.m.

After this culturing, the culture solution was divided by filtration into a cell portion and a filtrate portion. The cell portion was washed thoroughly with water, subjected to crushing together with beach sand within a mortar, suspended with distilled water of a volume equalling that of the liquid portion of the culture medium and tested for its α-galactosidase activity. Thhe value thus determined was taken as endogenous enzymatic activity. A 1 ml. portion of the filtrate portion was similarly tested for α-galactosidase activity. The value determined in this case was taken as exogenous enzymatic activity. The sum of the values of the said endogenous and exogenous α-galactosidase activity was taken as total activity. The total activity was expressed as the sum of the values of exogenous and endogenous α-galactosidase activity produced per ml. of the culture medium.

The residual sugar present in the culture medium was determined by the modified Somogyi method and expressed as glucose. The cell portion was dried at 105° C. until it reached a constant weight. The constant weight obtained by this drying was indicated as cell weight. The results are shown in Table 1.

TABLE 1

|  | Residual sugar (g./100 ml.) | Dry cell weight (g./100 ml.) | Total activity (u./ml.) |
| --- | --- | --- | --- |
| Control (basic culture medium alone) | 0.34 | 0.94 | 18,590 |
| Culture medium of this invention (incorporating oleic acid) | 0.025 | 1.76 | 28,570 |

As is evident from the preceeding table, addition of 0.1% of oleic acid increased the activity by more than 50%.

EXAMPLE 2

An aqueous solution having dissolved therein 1.5% of lactose, 0.5% of glucose, 1% of corn steep liquor, 0.6% of ammonium sulfate, 0.3% of calcium carbonate, 0.2% of magnesium sulfate, 0.2% sodium chloride and 0.3% potassium phosphate was adjusted to pH 5.0. Two 20-liter portions of this aqueous solution were placed each in jar fermentors and Silicon KM 70 was added thereto as an antifoam agent. The resultant mixtures in one jar fermentor was sterilized and used as the basic culture medium. The mixture in the other jar fermentor was sterilized and had oleic acid incorporated therein at a concentration of 0.1%. Separately, *Mortierella vinacea* var. raffinose-utilizer was inoculated to 100 ml. of a culture medium having the same composition as mentioned above and cultured for 24 hours to obtain a seed culture. The seed culture was added to the aforementioned basic culture medium and to the culture medium incorporating therein oleic acid. The two culture media containing the microorganism were agitated at 30° C. at the rate of 200 r.p.m., with air fed at a flow volume of 10 liters per minute. At the indicated intervals of time, the contents of the two fermentors were sampled and assayed. The results are shown in Table 2 below.

TABLE 2

|  | Oleic acid | Residual sugar (g./100 ml.) | Dry cell weight (g./100 ml.) | Total activity (u./ml.) |
| --- | --- | --- | --- | --- |
| Culturing time (hours): |  |  |  |  |
| 0 | + | 1.49 | 0.25 |  |
|  | − | 1.49 | 0.25 |  |
| 24 | + | 0.91 | 0.69 | 9,200 |
|  | − | 0.95 | 0.54 | 2,000 |
| 48 | + | 0.02 | 1.16 | 35,200 |
|  | − | 0.62 | 0.66 | 18,000 |
| 72 | − | 0.23 | 0.87 | 29,100 |

In the preceding table, the symbols + and − denote addition of the presence and absence of oleic acid respectively.

The table clearly indicates a contrast in that the culture medium incorporating oleic acid produced α-galactosidase possessed of activity of 35,200 units after 48 hours of culturing time, whereas the culture medium incorporating no oleic acid produced α-galactosidase having activity of 29,100 units after 72 hours of time.

EXAMPLE 3

The same basic culture medium as prepared in Example 1 was obtained and divided into smaller portions.

The fatty acids listed in Table 3 were added to the smaller portions each at a concentration of 0.1% by weight.

With these culture media, *Mortierella vinacea* var. raffinose-utilizer was cultured under the same conditions as used in Example 1. The results are shown in Table 3 below.

TABLE 3

| Kind of fatty acid incorporated | Number of carbon atoms of fatty acid | Total activity (u./ml.) |
|---|---|---|
| No addition | | 17,538 |
| n-Capronic acid | 6 | 0 |
| Enanthic acid | 7 | 0 |
| Caprylic acid | 8 | 0 |
| Pelargonic acid | 9 | 0 |
| n-Capric acid | 10 | 0 |
| Undecanic acid | 11 | 10,912 |
| Lauric acid | 12 | 29,664 |
| Tridecanic acid | 13 | 23,776 |
| Tetradecanic acid | 14 | 32,384 |
| Pentadecanic acid | 15 | 21,824 |
| Palmitic acid | 16 | 25,344 |
| Heptadecanic acid | 17 | 22,976 |
| Nonadecanic acid | 19 | 29,248 |
| Undecylenic acid | 11 | 0 |
| Ricinaleic acid | 16 | 32,766 |
| Oleic acid | 18 | 30,046 |
| Linoleic acid | 18 | 27,296 |
| Linoleinic acid | 18 | 34,336 |
| Elaidic acid | 18 | 21,440 |
| Vaccenic acid | 18 | 30,432 |

It is evident from the preceding table that, in the culture media incorporating fatty acids having up to 11 carbon atoms the fatty acids suppressed or totally inhibited the microorganic growth so that no α-galactosidase activity was produced in most cases.

EXAMPLE 4

The same culture medium as prepared in Example 1 was obtained and divided into smaller portions. The fatty acid derivatives and their corresponding higher alcohols and aldehydes indicated in Table 4 were added to the smaller portions of culture medium each at a concentration of 0.1% by weight. With these culture media, *Mortierella vinacea* var. raffinose-utilizer was inoculated and cultured for the comparison of activity. The culturing conditions and the like were the same as in Example 1. The results are shown in Table 4 below.

TABLE 4

| Substance added: | Total activity (u./ml.) |
|---|---|
| No addition | 18,100 |
| Lauraldehyde | 29,856 |
| Myristyl alcohol | 29,152 |
| Palmitoyl chloride | 29,856 |
| Oleyl alcohol | 27,008 |
| Ethyl oleate | 26,304 |
| Oleic acid amide | 27,008 |
| Sodium stearate | 21,312 |
| Stearyl alcohol | 32,640 |
| Ethyl linoleate | 22,016 |
| Sodium linoleate | 26,240 |

EXAMPLE 5

Culture media were prepared by incorporating oleic acid, olive oil and peanut oil, each at a concentration of 0.1% by weight, into the same basic culture medium as prepared in Example 1. *Penicillium viridicalum* Westling IAM-7055 was inoculated to the culture media for the comparison of effect. The culturing conditions were the same as those of Example 1, except that the culturing time was 96 hours. The results are shown in Table 5 below.

TABLE 5

| Substance added | Residual sugar (g./100 ml.) | Dry cell weight (g./100 ml.) | Total activity (u./ml.) |
|---|---|---|---|
| No addition | 0.56 | 0.95 | 8,400 |
| Oleic acid | 0.098 | 1.28 | 25,800 |
| Olive oil | 0.098 | 1.19 | 27,700 |
| Peanut oil | 0.11 | 1.13 | 26,500 |

EXAMPLE 6

A culture medium was prepared by adding oleic acid at a concentration of 0.1% by weight to the same basic culture as prepared in Example 1. To the divided portions of the culture medium, the various molds indicated below were inoculated and cultured for the comparison of effect derived from the addition of oleic acid. The culturing conditions were the same as those of Example 1. The results are shown in Table 6 below.

TABLE 6

| Name of strain | Oleic acid addition | Residual sugar (g./100 ml.) | Dry cell weight (g./100 ml.) | Total activity (u./ml.) |
|---|---|---|---|---|
| *Aspergillus inui* IAM 2255 | − | 0.39 | 0.91 | 1,980 |
| | + | 0.058 | 1.37 | 4,330 |
| *Aspergillus nidulans* IAM 2006 | − | 0.63 | 0.66 | 308 |
| | + | 0.13 | 1.18 | 8,134 |
| *Circinella chinensis* Naganishi et Kojiro IFO 4453 | − | 0.69 | 0.58 | 1,190 |
| | + | 0.02 | 1.79 | 4,980 |
| *Circinella sydowi* Lendner IFO 4457 | − | 0.02 | 1.11 | 10,200 |
| | + | 0.007 | 1.26 | 25,020 |
| *Circinolla minor* Lendner IFO 4454 | − | 0.61 | 0.58 | 696 |
| | + | 0.018 | 1.11 | 8,791 |
| *Mucor pusillus* Lindt IFO 4580 | − | 0.018 | 0.82 | 1,010 |
| | + | 0.011 | 1.12 | 9,802 |
| *Syncephalastrum racemosum* Shröter IFO 4827 | − | 0.53 | 0.63 | 1,574 |
| | + | 0.066 | 1.14 | 5,104 |

EXAMPLE 7

To the divided portions of the basic culture medium described in Example 1 were added sodium oleate and sodium linoleate at the various concentrations ranging from 0.025 to 1% by weight as indicated in Table 7 below. *Mortierella vinacea* var. raffinose-utilizer was inoculated to these culture media and cultured under the same conditions as those of Example 1. The results are shown in Table 7.

TABLE 7

| Kind of fatty acid | Amount added (percent) | Total activity (u./ml.) |
|---|---|---|
| Sodium oleate | | 18,000 |
| | 0.025 | 28,900 |
| | 0.100 | 28,900 |
| | 0.250 | 30,100 |
| | 0.500 | 31,400 |
| | 1.000 | 31,300 |
| Sodium linoleate | 0.025 | 25,200 |
| | 0.050 | 26,400 |
| | 0.100 | 27,000 |
| | 0.250 | 27,900 |
| | 0.500 | 27,700 |
| | 1.000 | 27,800 |

The preceding table clearly indicates that the α-galactosidase activity was increased even in culture media incorporating the sodium salts at the very low concentration of 0.025% and that addition of these salts above the level of 0.1% produced no appreciable increase of activity.

We claim:
1. A method for the manufacture of α-galactosidase by use of a mold, which method comprises adding at least one member selected from the group consisting of higher fatty acids, higher alcohols, higher aldehydes and their functional derivatives each possessed of 12 or more carbon atoms to a basic culture medium at a concentration of between about 0.025 and about 0.1% by weight based on the basic culture medium and culturing in the prepared culture medium a mold capable of producing α-galactosidase.

References Cited
UNITED STATES PATENTS

| | | | |
|---|---|---|---|
| 3,186,921 | 6/1965 | Rupe | 195—114 X |
| 3,511,752 | 5/1970 | Tanaka et al. | 195—114 X |
| 3,647,625 | 3/1972 | Suzuki et al. | 195—11 |

LIONEL M. SHAPIRO, Primary Examiner

U.S. Cl. X.R.

195—114